US008694619B2

(12) United States Patent
Mariblanca Nieves

(10) Patent No.: US 8,694,619 B2
(45) Date of Patent: Apr. 8, 2014

(54) PACKET CLASSIFICATION METHOD AND APPARATUS

(75) Inventor: David Mariblanca Nieves, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 171 days.

(21) Appl. No.: 13/384,177

(22) PCT Filed: Jul. 30, 2009

(86) PCT No.: PCT/EP2009/059910
§ 371 (c)(1),
(2), (4) Date: Jan. 13, 2012

(87) PCT Pub. No.: WO2011/012165
PCT Pub. Date: Feb. 3, 2011

(65) Prior Publication Data
US 2012/0117220 A1 May 10, 2012

(51) Int. Cl.
*G06F 15/173* (2006.01)
(52) U.S. Cl.
USPC ....... 709/223; 709/203; 370/395.43; 370/235
(58) Field of Classification Search
USPC .............. 709/203, 223; 370/395.43, 235
See application file for complete search history.

(56) References Cited

U.S. PATENT DOCUMENTS

| 7,450,591 | B2 * | 11/2008 | Korling et al. | 370/395.43 |
|---|---|---|---|---|
| 2003/0154174 | A1 * | 8/2003 | Tassel et al. | 705/412 |
| 2010/0217877 | A1 * | 8/2010 | Willars et al. | 709/228 |
| 2012/0117220 | A1 * | 5/2012 | Mariblanca Nieves | 709/223 |

FOREIGN PATENT DOCUMENTS

WO 2009051527 A1 4/2009

OTHER PUBLICATIONS

3rd Generation Partnership Project, "Policy and Charging Control Over Gx Reference Point," 3GPP; Technical Specification Group Core Network and Terminals, 3GPP TS 29.212v8.4.0 (Release 8), May 2009, pp. 1-83.
3rd Generation Partnership Project, "Policy and Charging Control Architecture," 3GPP; Technical Specification Group Services and System Aspects, 3GPP TS 23.203v8.6.0 (Release 8), Jun. 2009, pp. 1-113.

* cited by examiner

*Primary Examiner* — Frantz Jean
(74) *Attorney, Agent, or Firm* — Coats & Bennett, P.L.L.C.

(57) ABSTRACT

A method of handling packets within a packet-based communication system implementing a policy and charging control architecture. The method comprises, at one or more policy and charging enforcement functions within a packet switched access network or networks, monitoring packet flows to determine user usage on a per service class basis, and periodically reporting the determined usage from the policy and charging enforcement functions to a policy and charging rules function. At the policy and charging rules function, the received usage information is used in order to generate one or more one or more rule sets, each rule comprising one or more packet properties and one or more actions for handling a packet. The or at least one rule set is sent to the or each policy and charging enforcement function where they are applied in order to determine an action or actions for handling a packet.

29 Claims, 4 Drawing Sheets

PACKET CLASSIFICATION METHOD AND APPARATUS

TECHNICAL FIELD

The present invention relates to a method and apparatus for classifying packets. The invention is applicable in particular to a method and apparatus for classifying packets in a 3GPP Policy and Charging Control architecture.

BACKGROUND

Telecommunications services provided over an IP Connectivity Access Network (IP-CAN) can be subject to charging and policy control mechanisms. This includes Quality of Service (QoS) control. Accordingly, some telecommunications systems incorporate so-called Policy and Charging Control (PCC) architectures to provide this control. For example, 3GPP TS 23.203 V8.6.0 describes such a PCC architecture in respect of packet flows in an IP-CAN session established by a user terminal through an Evolved 3GPP telecommunications system, including both 3GPP accesses (GERAN/UTRAN/E-UTRAN) and Non-3GPP accesses. FIG. 1 illustrates schematically an example of the PCC architecture described in 3GPP TS 23.203 that comprises a Policy and Charging Enforcement Function (PCEF), a Bearer Binding and Event Reporting Function (BBERF), a Policy and Charging Rules Function (PCRF), an Application Function (AF), an Online Charging System (OCS), an Offline Charging System (OFCS), and a Subscription Profile Repository (SPR).

The PCRF is a functional element that encompasses policy control decision and flow based charging control functionalities, a combination of the functionality of the Policy Decision Function (PDF) and the Charging Rule Function (CRF) defined in release 6 of the 3GPP specification. A PCRF can be implemented as a standalone node and behaves as a Policy Decision Point (PDP), or Policy Server (PS), that stores user data related to QoS enforcement, access control lists, etc. The PCRF provides policy and charging control for the media components negotiated between the user terminal and the AF. The PCRF receives session and media related information from the AF and informs the AF of traffic plane events. The PCRF also provides network control regarding the service data flow detection, gating, QoS and flow based charging (except credit management) towards the PCEF. The PCRF can provision PCC rules and PCC decisions to the PCEF via the Gx reference point. Criteria such as the QoS subscription information may be used together with policy rules such as, service-based, subscription-based, or pre-defined PCRF internal policies to derive the authorized QoS to be enforced for a service data flow. The PCRF PCC decisions may be based on one or more of the following:

information obtained from the AF via the Rx reference point, e.g. the session, media and subscriber related information;
information obtained from the PCEF via the Gx reference point, e.g. IP-CAN bearer attributes, request type, subscriber related information and location information;
information obtained from the SPR via the Sp reference point, e.g. subscriber and service related data;
information pre-defined in the PCRF; and
information obtained from BBERF via the so-called Gxx reference point.

The PCEF is a functional entity that behaves as a Policy Enforcing Point (PEP) for enforcing decisions instructed by the PCRF and the OCS. The PCEF provides service data flow detection (based on the service data flow filter filters defined in the PCC rules) to capture and analyse any user and signalling traffic, to identify the user and to capture details of the service(s) being used. The PCEF can then communicate this information to the PCRF over the Gx interface, to the OCS over the Gy interface, and to the OFCS over the Gz interface. The PCEF enforces QoS control according to the QoS authorised by the PCRF. The PCEF is typically deployed functionally between an access gateway giving access to a packet data network and an application server giving access to a particular service or set of services. The PCEF is preferably physically co-located within the gateway node implementing the IP access to the PDN. As such, in a GPRS core network the PCEF is located within the GPRS Gateway Support Node (GGSN), whilst in the case of a CDMA2000 network the PCEF may be located in a Packet Data Serving Node (PDSN), and in a WLAN network the PCEF may be located in a Packet Data Gateway (PDG).

The BBERF functionality includes bearer binding, uplink bearer binding verification and event reporting to the PCRF. For example, in a GPRS core network the bearer binding mechanism associates the PCC rule with the PDP context that is to carry the service data flow. When GPRS Tunnelling Protocol (GTP) is used between the BBERF and the PCEF then bearer binding is performed by the PCEF. Alternatively, when Proxy Mobile IP (PMIP) is used between the BBERF and the PCEF, instead of GTP, then bearer binding is performed by the BBERF.

The OCS provides authorization for the usage of network resources based on the provisioned data and the user activity information it receives from PCEF. This authorization must be granted by the OCS prior to the actual resource usage. When receiving a network resource usage request, the network assembles the relevant charging information and generates a charging event towards the OCS in real-time. The OCS then returns an appropriate resource usage authorization over the Gy interface. The resource usage authorization may be limited in its scope (e.g. volume of data or duration) therefore this authorization may have to be renewed from time to time as long as the user's resource usage persists. The OCS can support time, volume and event-based charging.

The AF is an element offering applications that require policy and/or charging control of the IP-CAN user plane behaviour. The AF communicates with the PCRF over the Rx interface to transfer dynamic session information (e.g. a description of the media to be delivered in the transport layer) required for PCRF decisions, as well as to receive IP-CAN specific information and notifications about IP-CAN bearer level events. One example of an AF is the P-CSCF of the IP Multimedia Core Network (IM CN) subsystem. In the case of a P-CSCF, the information communicated over the Rx interface is derived from the P-CSCF session information (e.g. SDP when SIP is used for signalling) and it mainly includes media components. A media component comprises a set of IP flows, each of which is described by a 5-tuple, the media type and required bandwidth.

The SPR contains all subscriber/subscription related information needed for subscription-based policies and IP-CAN bearer level PCC rules by the PCRF. The Sp interface allows the PCRF to request subscription information related to the IP-CAN transport level policies from the SPR based on a subscriber ID and other IP-CAN session attributes.

Considering further a state-of-the-art PCEF, in short this can performs the two steps of:
1) inspecting the content of a received (originating or terminating) data packet, and 2) classifying the packet according its content and to some static rules, where these rules are predefined in the PCEF for specific packet contents.

Step 1) usually involves a two-step process carried out by an "analysis engine". The first step is optionally to associate the packet with a user, either the packet sender (source IP address) or the packet recipient (destination IP address). The second step is to determine, as accurately as possible, a protocol to which the packet corresponds. This might involve a relatively "shallow" inspection (e.g. inspecting some layer 3 and 4 headers of the packet, such as transport and/or network layer headers), and/or a deep packet inspection (DPI) (e.g. inspecting the packet content beyond the headers cited above, including the packet payload), or the application of some heuristics to the packet content (e.g. to identify characteristics or behavioural patterns).

Step 2) is carried out by a "classification engine" in order to determine a specific treatment for the data packet (e.g. at the level of: applicable charging, applicable QoS, content filtering, etc). The PCEF uses the packet context and stateful flow analysis information obtained during the inspection phase to classify the packet into the right service class. WAP navigation, MMS traffic, HTTP browsing, and downloads are examples of service classes. The classification rules in the PCEF are static rules. This classification step essentially places packets into specific service sessions within a user session.

An example of a service class configured in the PCEF might be a service class for HTTP. This could be specified as follows:

```
service-class 100
    pattern web-browsing
        URL http://www.google.es
    end
    credit-control on
    QoS Gx-driven
    ...
end
```

In this example, the type of protocol to match is HTTP. The PCEF has a set of pre-defined patterns, and the pattern that corresponds to HTTP protocol is called "web-browsing". Within this pattern, one or more URLs may be specified. In this case, the URL to match is "www.google.es". When any packet matches the conditions in the service class (that is, HTTP protocol and URL=www.google.es), the actions specified in the service class will be taken, namely credit control will be performed (against a pre-defined Credit Control server), and a request to the PCRF will be performed in order to obtain the QoS for this service class.

A further example of a service class definition might be as follows:

```
service-class 105
    pattern P2P
        protocol BitTorrent
    end
    QoS Gx-driven, Local (peakBW=100)
    ...
end
```

Here, the pattern used is a peer to peer protocol, more specifically "BitTorrent". When the PCEF detects a BitTorrent packet, it will apply the locally specified QoS, that is, a peak bandwidth of 100 kbps unless a QoS is received via the Gx interface in which case the Gx-driven QoS will take precedence.

It will be apparent that, in order to implement a detailed level of control covering a broad range of users and services, the classification rules defined in the PCEF tend to be both complex and numerous. The content of a received packet must be inspected against a huge number of classification rules before it can be properly classified into a service session inside a user session. This can cause delays in packet routing, and increases the processing load in the node performing the inspection/classification.

Conventional PCEF classification engines use what are effectively statically defined rules, and the analysis of the packets versus the classification rules is made in the order that these rules are configured. Typically, once a matching rule is identified for a packet, the search is terminated and the actions specified in the matching rule applied. Consider for example the case where the analysis engine determines that a packet matches to the HTTP protocol, and that the classification engine has extracted the URL from the HTTP protocol header. The classification engine must then look up the rules in the rules list, one by one, to identify if one of these rules contains a match for the identified protocol and the extracted URL.

SUMMARY

It is an object of the present invention to overcome or at least mitigate the problems inherent with the use of a statically defined, global rule set for PCC architectures. This is achieved by introducing a mechanism to monitor user behaviour and to respond to changes in this behaviour by dynamically altering the rule set and/or introducing rules on a per service class and/or per user basis.

According to a first aspect of the present invention there is provided a policy and charging rules server for use in a policy and charging control architecture of a packet-based communication system. The server comprises a memory for storing one or more sets of packet classification rules, each rule comprising one or more packet properties and one or more actions for handling a packet. An interface is provided for periodically receiving from one or more policy and charging enforcement servers located in a packet switched access network or networks, information identifying user usage on a per service class basis. A rule set generator updates the packet classification rule set(s) in dependence upon the received data, whilst a rule set sender sends, via said interface, the updated rule set(s) to the or at least one of the policy and charging enforcement servers.

Embodiments of the invention can be used to optimise packet classification at a packet handler, such as an access gateway. Packet handling delays are reduced, leading to an improved user experience.

Said information may identify user usage by way of uploaded and/or downloaded data volume. The information may identify service classes by way of one of service class identifiers and service class descriptions.

The memory of the policy and charging rules server may be configured to store, for each of a set of users of the system, at least one packet classification rule set, and said interface periodically receives said information on both a per user and per service class basis from the policy and charging enforcement servers currently associated with those users. In this case, said rule set generator is configured to update the packet classification rule set(s) associated with a user upon receipt of information concerning that user, and said rule set sender is configured to send the updated rule set(s) to the policy and charging enforcement server.

Alternatively, said interface may be configured to receive said information in the form of reports combining, for each service class, usage for users of a user set associated with an originating policy and charging enforcement server, and said rule set generator being configured to generate a rule set or sets that is or are globally applicable to all users of the user set.

At least certain of said rules may comprise at least an identification of a service protocol, e.g. HTTP and, additionally, a specification of at least one Universal Resource Locator.

Said interface may be configured as a 3GPP Gx interface.

The rule set generator may be configured to generate different rule sets for different time periods, said sender sending rule sets applicable to the current time.

According to a second aspect of the present invention there is provided a policy and charging enforcement server for use in a policy and charging control architecture of a packet switched access network. The server comprises a memory for storing one or more rule sets, each rule comprising one or more packet properties and one or more actions for handling a packet. A packet analyser is provided for determining, for each packet handled by the server, at least a service protocol with which the packet is associated. A packet classifier is further provided for applying a rule set to each packet and a determined protocol for that packet in order to match the packet to a rule and determine one or more actions for handling the packet. An interface is provided and configured for periodically sending to a policy and charging rules server, information provided by said packet classifier and identifying user usage on a per service class basis, for receiving an updated rule set or sets from the policy and charging rules server, and for installing this or these in said memory.

The information that is sent via said interface may identify user usage by way of uploaded and/or downloaded data volume passing through the policy and charging enforcement server. The information may identify service classes by way of one of service class identifiers and service class descriptions.

Said memory may be configured to store, for each of a set of users associated with the policy and charging enforcement server, at least one packet classification rule set, and said interface periodically receives updated rule sets on a per user and per service class basis.

Said interface may alternatively be configured to send said information in the form of reports combining, for each service class, usage for users of a set of users associated with the policy and charging enforcement server.

At least certain of said rules employed by the packet classifier may comprise at least an identification of a service protocol, e.g. HTTP, and additionally a specification of at least one Universal Resource Locator.

The interface of the policy and charging enforcement server may be configured as a 3GPP Gx interface.

Said packet classifier may be configured to select and apply a rule set to a packet in dependence upon the current time and/or day.

According to a third aspect of the present invention there is provided a method of handling packets within a packet-based communication system implementing a policy and charging control architecture. The method comprises, at one or more policy and charging enforcement functions within a packet switched access network or networks, monitoring packet flows to determine user usage on a per service class basis, and periodically reporting the determined usage from the policy and charging enforcement function(s) to a policy and charging rules function. At the policy and charging rules function, the received usage information is used in order to generate one or more one or more rule sets, each rule comprising one or more packet properties and one or more actions for handling a packet. The or at least one rule set is sent to the or each policy and charging enforcement function where they are applied in order to determine an action or actions for handling a packet.

The or each policy and charging enforcement function may determine user usage on a per service class and a per user basis, and said policy and charging rules function generates at least one rule set for each user of a set of users.

Alternatively, the or each policy and charging enforcement function may determine user usage on a per service class by combining usage for users of a user set associated with the policy and charging enforcement function, and said policy and charging rules function generates a rule set or sets that is or are globally applicable to all users of the user set.

According to a fourth aspect of the present invention there is provided computer program for causing a computer to implement a policy and charging rules function and to carry out the following steps:
- to store one or more sets of packet classification rules, each rule comprising one or more packet properties and one or more actions for handling a packet;
- to periodically receive from one or more policy and charging enforcement servers located in a packet switched access network or networks, information identifying user usage on a per service class basis;
- to update the packet classification rule set(s) in dependence upon the received data; and
- to send via said interface the updated rule set(s) to the or at least one of the policy and charging enforcement servers.

According to a fifth aspect of the present invention there is provided computer program for causing a computer to implement a policy and charging enforcement function and to carry out the following steps:
- to store one or more rule sets, each rule comprising one or more packet properties and one or more actions for handling a packet;
- to determine, for each packet handled by the server, at least a service protocol with which the packet is associated;
- to apply a rule set to each packet and a determined protocol for that packet in order to match the packet to a rule and to determine one or more actions for handling the packet, and to determine information identifying user usage on a per service class basis;
- to periodically send said information to a policy and charging rules server; and
- to receive an updated rule set or sets from the policy and charging rules server,
and to install this or these in said memory.

DETAILED DESCRIPTION

Figure 1:
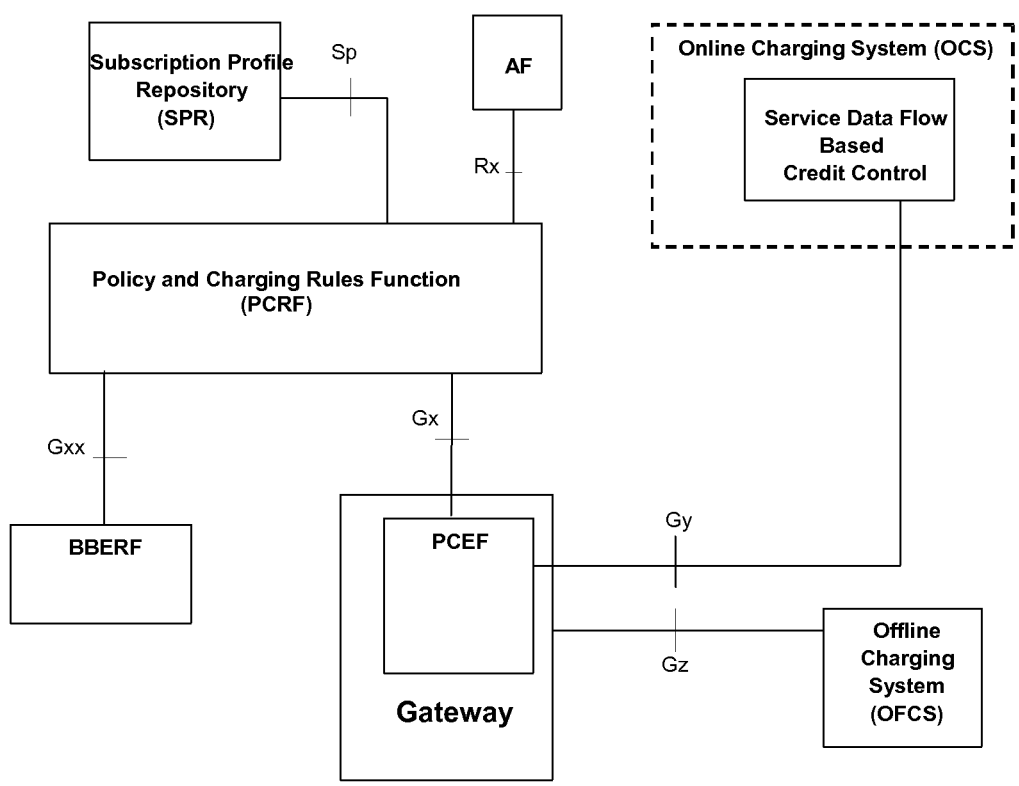
FIG. 1 illustrates schematically a PCC architecture of a 3GPP system.

As has been discussed above, a Policy and Charging Enforcement Function (PCEF) within a Policy and Charging Control (PCC) architecture may employ packet analysis and classification engines in order to classify packets and determine actions to be applied. In order to reduce the complexity of the process, one might, according to an embodiment of the present invention, consider ranking the rules used by the classification engine in some order of popularity in order to optimise the classification process. This will make it more likely that a match will be found at an early stage in the search. An improvement on this approach might be to define a rules order on a per user basis, with the order being established based on a user use history, and being updated dynamically to take into account long term changes in user behaviour. The rule set is referred to collectively as a User Customized Rules (UCR).

The existing functional entities referred to as the PCEF and PCRF, according to the 3GPP PCC architecture, are taken as the basis for the following discussion. These are enhanced with the following new functionality:

The PCEF will send, and the PCRF will receive, service usage information.

The PCRF will process the received service usage information and elaborate a new UCR.

The PCRF will send, and the PCEF will receive, the new UCR.

Service usage information will be reported by the PCEF to the PCRF using a modified version of the existing Gx interface (see 3GPP TS 23.203), which is referred to here as the Gx+ interface. The PCEF will make use of the existing Gx messages Credit Control Request/Answer (CCR/CCA), modified in order to accommodate the mentioned parameters. With the Gx+, the PCEF will send periodically or on request a service usage report, containing an identifier of the recently used service class(es), and the usage of the service(s) (bytes, time, etc.). If the PCEF and the PCRF have a knowledge of how each other are configured, the PCEF can simply send an identifier of the service class (a label) that will be immediately and unequivocally associated with a service in the PCRF. Using the example presented above, if the PCEF sends a service class identifier "105", the PCRF will understand that it refers to the BitTorrent service. If on the other hand the PCEF and the PCRF do not have any knowledge of their respective configurations, e.g. they have been built by different vendors, the PCEF will send as much information as possible concerning the service class data. Considering the example above, if the PCEF wants to send service usage information in respect of the service class 100, it will send a complete description of the service, such as:

```
service-class 100
    protocol HTTP
        URL http://www.google.es
end
```

Note that the service class identifier ("100") is included so that the PCRF can include this in the response back to the PCEF, instead of including again all of the service definition.

Together with the service class identifier, the PCEF will send a counter of service usage, e.g. measured in bytes. For example, for the service class "100", the reporting will look like:

```
service-class 100
    protocol HTTP
        URL http://www.google.es
        unit Mbps
        usage 13
end
``` indicating to the PCRF that, for protocol HTTP and URL www.google.es, 13 Mbps have been consumed (either uplink or downlink) for that user.

The PCRF will combine any newly received usage data with the historical data for the user, to generate a service class "popularity" index. An example index is illustrated in Table 1 below. In the case where the PCEF is reporting the complete description of the service (not just the service class label or identifier), the PCRF will keep a separate table with the mappings between the service class identifiers and the descriptions of the services. The PCRF can then use this table to determine an (internal) service class identifier on the basis of a received service description. The index established for a user may be "cleared" periodically, e.g. monthly, and the index rebuilt as new data is collected. This may help the mechanism adapt more quickly to changes in user behaviour, e.g. as websites increase and decrease in popularity.

The PCRF will send the composed UCR (e.g. as defined in Table 1) to the PCEF using the Credit Control Answer message. New parameters are needed in order to transport the data. The data may be sent simply as an ordered list of service class identifiers, e.g.:

```
UCR
    100, 105, 126, 204
end
```

Note that the PCRF makes use of the service-class identifiers that the PCEF has sent, so it does not need to send back the service description details. The PCEF, upon reception of the UCR, will convert the UCR into pointers that point to the service classes identified. For example, if the PCEF has configured the service classes as the ordered list shown in Table 2, the PCEF will convert the received UCR to the list:

Mapped UCR 3, 7, 2, 5 which indicates the positions where the service-classes received in the UCR are placed. This mechanism is very powerful as the final result (i.e. the Mapped UCR) is very short (i.e. it consumes very little memory space) and provides a very quick way for the classification engine to find the service-classes.

For the service classes not included in the UCR (in the previous example, service class 32, service class 67, etc), the PCEF will insert them at the end of the Mapped UCR, in order to classify traffic that does not match the service classes received in the UCR, e.g.:

Mapped UCR 3, 7, 2, 5, 1, 4, 6, 8

The UCR will be sent either in the Credit Control Answer message (CCA), when the PCRF responds to PCEF, or initiated by the PCRF by means of the existing Re-Authorization Request/Answer messages (RAR/RAA) of the Gx interface. In both cases, the PCRF will decide when the UCR has to be sent to the PCEF, and will depend on configurable parameters like periodicity (every hour, every day, etc.) or local decision taken in the PCRF (when the service classes have change positions in the UCR, etc.)

The PCRF represents a common, and persistent storage location for the UCRs. Typically, a user may access a service via any one of a plurality of access points (GGSN/PCEF pairs). However, all of these access points have an interface towards the PCRF.

Figure 2:
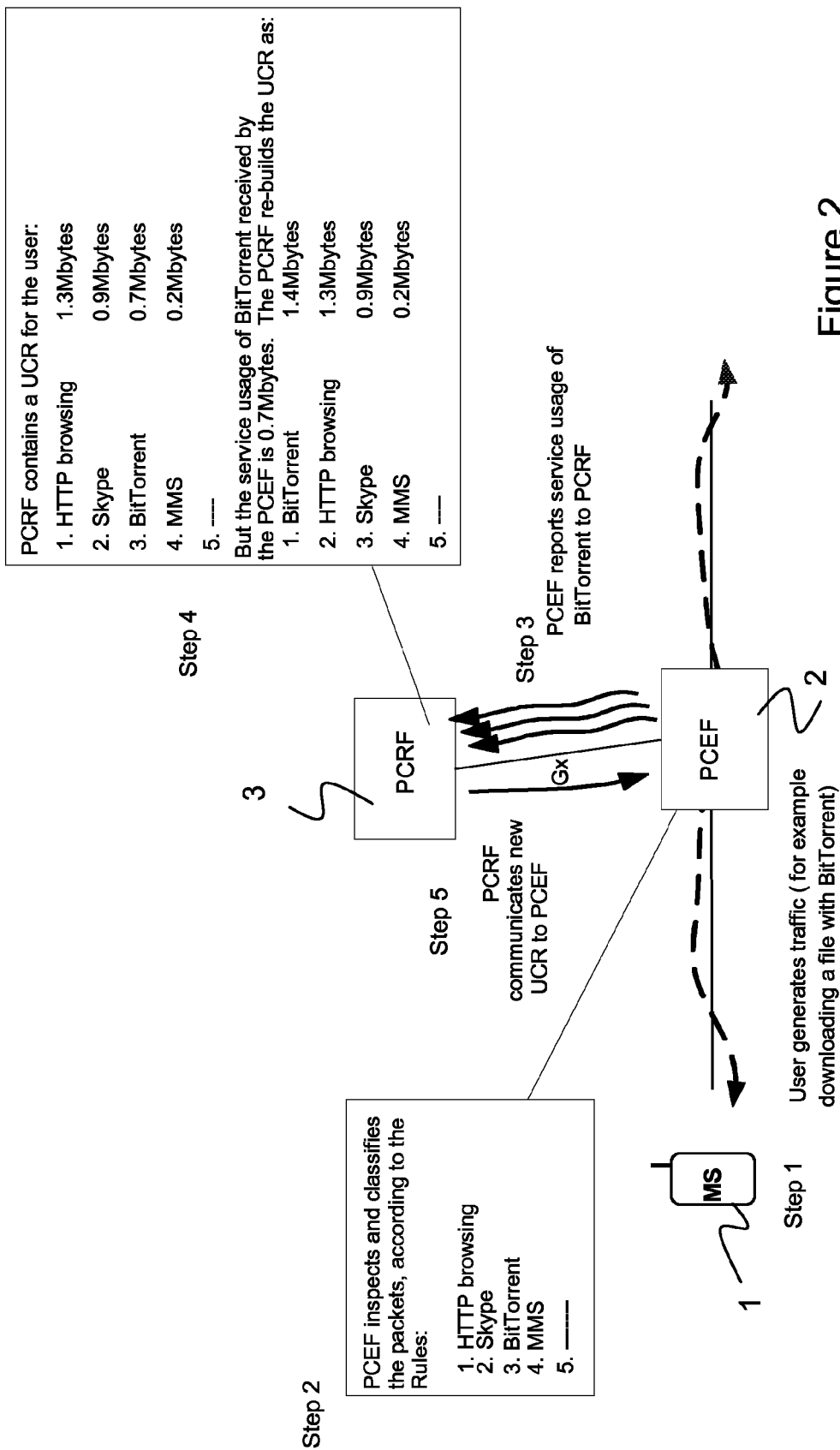
FIG. 2 illustrates schematically nodes and process steps within a PCC architecture for generating updated classification rule sets (UCRs)

FIG. 2 illustrates schematically a procedure for maintaining and deploying a per user packet classification mechanism. It is assumed that a user employing a mobile station (MS) 1, which may be for example a cellular telephone, has registered with a home network and has activated a PDP context towards the GGSN/PCEF. Upon activation of the PDP context, the PCEF requests that the PCRF provide to it a UCR for the user. This is received and stored by the PCRF. The user then chooses to download a file over the Internet, for example using the BitTorrent service (step 1). Packets associated with this download are routed through the PCEF 2 which is typically co-located with the GGSN in a 3G network. For each packet received by the PCEF, the PCEF classifies the packet according to a previously downloaded UCR (step 2). Periodically, the PCEF reports the service usage to the PCRF 3, in this case relating to the BitTorrent service (step 3). By way of example, FIG. 2 illustrates a "before" and "after" state of a UCR, showing a change in the ordering of the service classes (step 4) as a result of the new information received from the PCEF. The PCRF communicates the new UCR to the PCEF (step 5).

Figure 3:
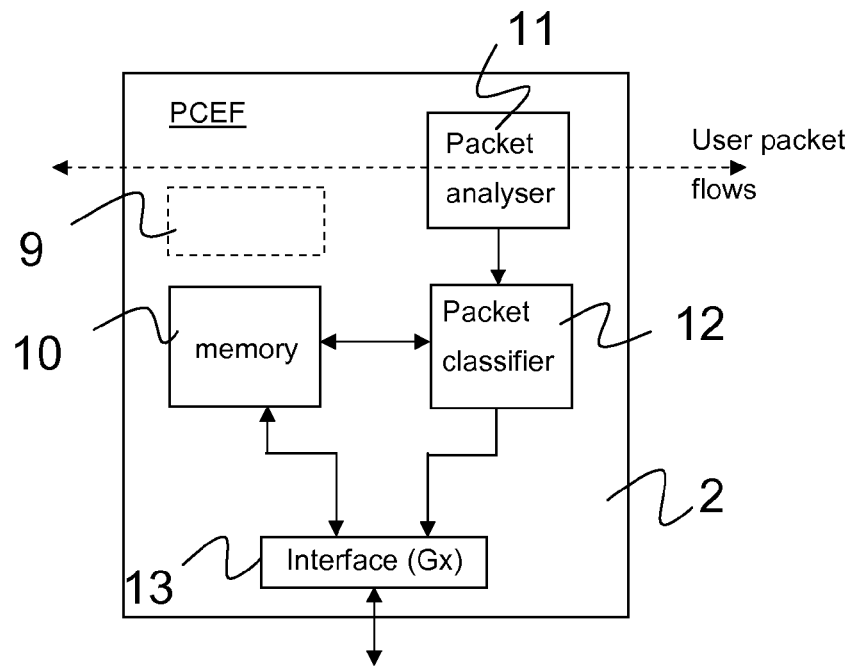
FIG. 3 illustrates schematically a PCEF of the network architecture of FIG. 2.

FIG. 3 illustrates schematically the PCEF 2 of FIG. 2, including various functional components. It will be appreciated that the PCEF may in practice be implemented on a computer server, as combination of hardware and software, where the software code is stored in one or more program memories 9. Referring to FIG. 3, the PCEF comprises a memory 10 for storing a set of user specific UCRs in respect of users currently having a PDP context activated with the co-located GGSN. A packet analyser 11 intercepts packets flowing through the GGSN and identifies, using certain traffic patterns, associated protocols and any further relevant information require to perform the packet classification. The determined data, together with the packets themselves, are passed to a packet classifier 12 which extracts the appropriate classification rule set from the memory 10 and attempts to find a matching rule as described above. If a matching rule is found, the appropriate action is applied. The PCEF collects usage information on a per user and per service class basis and periodically reports this to the PCRF via an interface 13. New UCRs are also received at the interface 13 from the PCRF and are stored in the memory 10.

Figure 4:
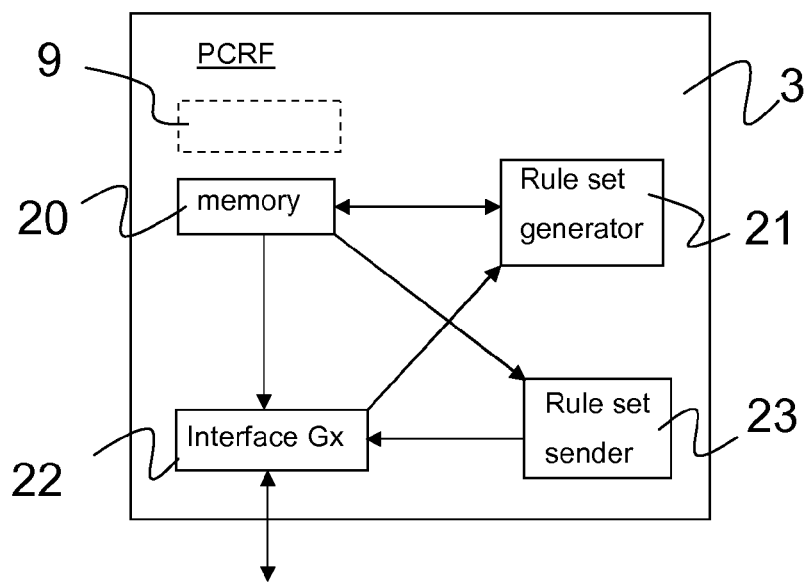
FIG. 4 illustrates schematically a PCRF of the network architecture of FIG. 2.

FIG. 4 illustrates schematically the PCRF 3 of FIG. 2, including various functional components. It will be appreciated that the PCRF may in practice be implemented on a computer server, as combination of hardware and software, where the software code is stored in one or more program memories 19. Referring to FIG. 4, the PCRF comprises a memory 20 for storing user specific UCRs. These UCRs are generated by a rule set generator 21 in dependence upon usage reports received from one or more PCEFs via an interface 22. Newly generated reports are sent by a rule set sender 23, via the interface 22, to the appropriate PCEF.

Figure 5:
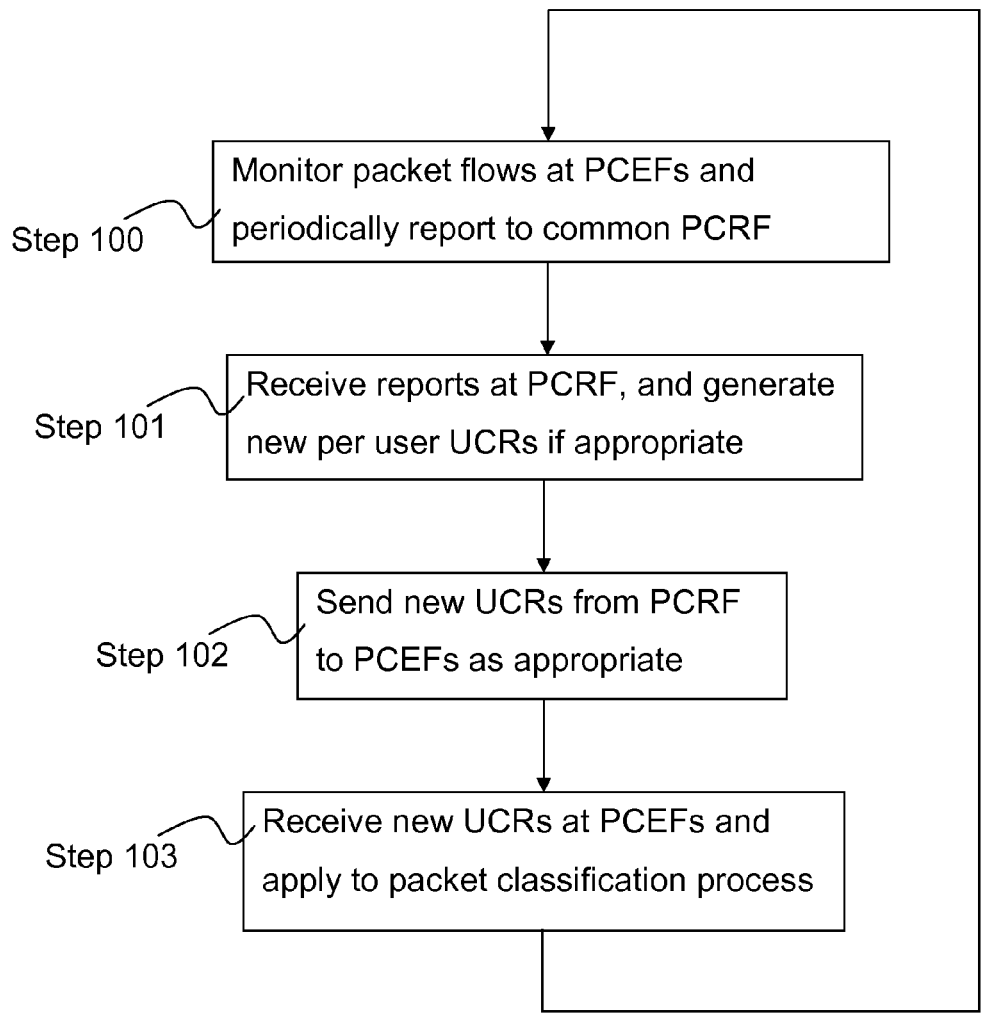
FIG. 5 is a flow diagram illustrating a process implemented in the network architecture of FIG. 2.

FIG. 5 is a flow diagram illustrating the main steps in the UCR provision process described above. At step 100, the PCEFs within the system monitor usage (i.e. bandwidth occupied and/or data volume) on a per user and per service class basis. Each PCEF periodically reports usage to the common PCEF. At step 101, the PCRF receives the reports and, if the reports indicate a change in the behaviour of a given user, generates a new UCR for that user. The new UCRs are stored by the PCRF, and are sent out to the appropriate PCEF, e.g. periodically or on demand (step 102). At step 103, the newly generated UCRs are received by the appropriate PCEFs, and applied to the respective packet classification processes. Of course, the overall procedure is ongoing, dynamically updating and distributing UCRs.

The user experience may be further enhanced by taking into account an operator configured user profile when preparing the UCR in the PCRF. Consider for example a particular user having a QoS profile specifying that the maximum rate for HTTP browsing is 100 kbps and that for streaming is 1 Mbps. In this case it is desirable to configure the UCR to classify streaming packets more quickly than HTTP browsing packets. Considering the examples set out above, service class 100 is associated with HTTP browsing, whilst service class 105 is associated with P2P protocols. The (operator configured) user service profile in the PCRF may look like:

```
user-profile MSISDN=1234555
    ...
    QoS settings
        service-class 100
            max-bandwidth 100
        end
        service-class 105
            max-bandwidth 500
        end
        ...
    end
    ...
end
```

It can be seen that the bandwidth assigned to the browsing service class is 100 kbps whilst that assigned to the P2P service is 500 kbps. In this case, despite the fact that the PCEF may report a higher usage for the browsing service than for the P2P service, the PCRF may generate a UCR in which the P2P service (105) ranks higher than the browsing service (100). This situation is illustrated in Table 3 below.

Adjustments to the rankings contained within the UCR may be performed to take into account other QoS settings such as latency, jitter, etc. For example, a high latency setting for a particular service class may cause this service class to be moved into a lower position in the UCR list.

In order to take into account different user usage patterns at different times of the day or on different days, the PCRF may maintain so-called partial UCRs for each of these different periods. So, for example, the UCR may maintain one partial UCR for week days, and one for the weekend. Within a working day, the day may be further sub-divided into a working period (e.g. 9 am-5 pm) and a non-working period (the remainder), with a partial UCR being maintained for each. The partial UCRs will be maintained in parallel by the PCRF, and provided to the PCEF at the appropriate times. This mechanism will allow an extremely flexible handling of UCRs in the PCEF and PCRF, adapting the classification engine in the PCEF to the user activity as much as possible.

In order to allow the PCRF to push a partial UCR to the PCEF, i.e. when a new time/date period commences, the PCRF will use Re-Authorization Request/Answer messages (RAR/RAA) of the Gx interface. The message exchange is initiated by the PCRF. Also, the PCRF can send the Partial UCR in a CCA message, when answering to a CCR initiated by the PCEF.

As well as distinguishing partial UCRs on the basis of the time of day, day of the week, etc., partial UCRs may also be distinguished using other parameters, for example user roaming status. In this case, the CCR/CCA messages may be used as follows:

CCR: PCEF will send a CCR message periodically, including the service usage report of every service, and the roaming status of the user.

CCA: PCRF will send the new Partial UCR, if the roaming status has changed. If the roaming status has not changed, the PCRF may send the UCR for some other reason (e.g. the service classes in the UCR have changed positions).

The classification mechanisms described here are made on a per-user basis and are therefore highly optimized. The user experience may be enhanced, ensuring, for example, that a user receives a QoS level for which he or she has paid.

It will be appreciated by the person of skill in the art that various modifications may be made to the above described embodiments without departing from the scope of the present invention.

TABLE 1

| Position | Service class | Usage (MBytes) |
|---|---|---|
| 1 | 100 | 32.4 |
| 2 | 105 | 22.1 |
| 3 | 126 | 12.9 |
| 4 | 204 | 4.6 |
| 5 | ... | ... |

TABLE 3

| Position | Service class | Usage (MBytes) |
|---|---|---|
| 1 | 105 | 31.7 |
| 2 | 100 | 32.4 |
| 3 | 126 | 12.9 |
| 4 | 204 | 4.6 |
| 5 | ... | ... |

TABLE 2

```
service-class 15
   ......
   end
service-class 126
   ......
   end
service-class 100
   ......
   end
service-class 58
   ......
   end
service-class 204
   ......
   end
service-class 67
   ......
   end
service-class 105
   ......
   end
service-class 32
   ......
   end
```

The invention claimed is:

1. A policy and charging rules server for use in a policy and charging control architecture of a packet-based communication system, the server comprising:
   a memory for storing one or more packet classification rules, each rule comprising one or more packet properties and one or more actions for handling a packet, wherein the rules are ranked according to a ranking order;
   an interface for periodically receiving from one or more policy and charging enforcement servers located in a packet switched access network or networks, information identifying user usage on a per service class basis;
   a rule set generator for updating at least one of the ranking order and the one or more of the packet classification rules in dependence upon the received information identifying the user usage on the per service class basis; and
   a rule set sender for sending via said interface at least one of the one or more packet classification rules and the ranking order that were updated to at least one of the policy and charging enforcement servers.

2. The policy and charging rules server according to claim 1, wherein said information identifies user usage by way of at least one of uploaded and downloaded data volume.

3. The policy and charging rules server according to claim 1, wherein said information identifies service classes by way of one of service class identifiers and service class descriptions.

4. The policy and charging rules server according to claim 1, wherein said memory is configured to store, for each of a set of users of the system, at least one of said packet classification rules, and said interface periodically receives said information on both a per user and per service class basis from the policy and charging enforcement servers currently associated with those users.

5. The policy and charging rules server according to claim 4, wherein said rule set generator is configured to update the one or more packet classification rules associated with a user upon receipt of information concerning that user, and said rule set sender is configured to send the one or more packet classification rules that have been updated to the policy and charging enforcement server.

6. The policy and charging rules server according to claim 1, wherein said interface is configured to receive said information in the form of reports combining, for each service class, usage for users of a user set associated with an originating policy and charging enforcement server, and said rule set generator being configured to generate said one or more packet classification rules that are globally applicable to all users of the user set.

7. The policy and charging rules server according to claim 1, wherein at least one of said packet classification rules comprise at least an identification of a service protocol.

8. The policy and charging rules server according to claim 7, wherein at least one of said packet classification rules contain an identification of the HTTP protocol and, additionally, a specification of at least one Universal Resource Locator.

9. The policy and charging rules server according to claim 1, wherein said interface is configured as a 3GPP Gx interface.

10. The policy and charging rules server according to claim 1, wherein said rule set generator is configured to generate different rules for different time periods.

11. The policy and charging rules server of claim 1 wherein the packet classification rules classify each of one or more packets in a specific service session within a user session.

12. A policy and charging enforcement server for use in a policy and charging control architecture of a packet switched access network, the server comprising:
   a memory for storing one or more rules, each of said rules comprising one or more packet properties and one or more actions for handling a packet; wherein said rules are ranked according to a ranking order;
   a packet analyser for determining, for each packet handled by the server, at least a service protocol with which the packet is associated;
   a packet classifier for applying at least one of said rules to each packet according to the ranking order and a determined protocol for that packet in order to match the packet to one of said rules and determine one or more actions for handling the packet; and
   an interface for periodically sending to a policy and charging rules server, information provided by said packet classifier and identifying user usage on a per service class basis, for receiving at least one of an updated ranking order and one or more updated rules from the policy and charging rules server, and for installing the one or more updated rules and the updated ranking order in said memory.

13. The policy and charging enforcement server according to claim 12, wherein said information identifies user usage by way of at least one of uploaded and downloaded data volume passing through the policy and charging enforcement server.

14. The policy and charging enforcement server according to claim 12, wherein said information identifies service classes by way of one of service class identifiers and service class descriptions.

15. The policy and charging enforcement server according to claim 12, wherein said memory is configured to store, for each of a set of users associated with the policy and charging enforcement server, at least one of said rules, and said interface periodically receives at least one updated rule on a per user and per service class basis.

16. The policy and charging enforcement server according to claim 12, wherein said interface is configured to send said information in the form of reports combining, for each service class, usage for users of a set of users associated with the policy and charging enforcement server.

17. The policy and charging enforcement server according to claim 12, wherein at least one of said rules comprises at least an identification of a service protocol.

18. The policy and charging enforcement server according to claim 17, wherein at least one of said rules contain an identification of the HTTP protocol and, additionally, a specification of at least one Universal Resource Locator.

19. The policy and charging enforcement server according to claim 12, wherein said interface is configured as a 3GPP Gx interface.

20. The policy and charging enforcement server according to claim 12, wherein said packet classifier is configured to select and apply one of said rules to the packet in dependence upon the current time and/or day.

21. The policy and charging enforcement server of claim 12 wherein the packet classification rules classify each of one or more packets in a specific service session within a user session.

22. A method of handling packets within a packet-based communication system implementing a policy and charging control architecture, the method comprising:
   at one or more policy and charging enforcement functions within a packet switched access network or networks, monitoring packet flows to determine user usage on a per service class basis;
   periodically reporting the determined usage from the one or more policy and charging enforcement functions to a policy and charging rules function;
   at the policy and charging rules function, using the received usage information to generate one or more rules, each rule comprising one or more packet properties and one or more actions for handling a packet, wherein the rules are ranked according to a ranking order;
   sending the one or more rules and the ranking order to at least one of the policy and charging enforcement functions; and
   applying a received rule according to the ranking order at the policy and charging enforcement function to determine an action or actions for handling a packet.

23. The method according to claim 22, wherein at least one of the policy and charging enforcement functions determines user usage on a per service class and a per user basis, and said policy and charging rules function generates at least one rule set for each user of a set of users.

24. The method according to claim 22, wherein at least one of the policy and charging enforcement functions determines user usage on a per service class by combining usage for users of a user set associated with the policy and charging enforcement function, and said policy and charging rules function generates one or more rules that are globally applicable to all users of the user set.

25. The method of claim 22 wherein the packet classification rules classify each of one or more packets in a specific service session within a user session.

26. A computer program product stored on a non-transitory computer readable medium that stores computer-executable process steps for implementing a policy and charging rules function, the computer-executable process steps causing a computer to:
   store one or more packet classification rules, each rule comprising one or more packet properties and one or more actions for handling a packet, wherein the rules are ranked according to a ranking order;
   periodically receive from one or more policy and charging enforcement servers located in a packet switched access network or networks, information identifying user usage on a per service class basis;
   update at least one of the ranking order and the one or more of the packet classification rules in dependence upon the received information identifying the user usage on the per service class basis; and
   send at least one of the updated ranking order and the updated rules to at least one of the policy and charging enforcement servers.

27. The computer program product of claim 26 wherein the packet classification rules classify each of one or more packets in a specific service session within a user session.

28. A computer program product stored on a non-transitory computer readable medium that stores computer-executable process steps for implementing a policy and charging enforcement function, the computer-executable process steps causing a computer to:
   store one or more rules, each rule comprising one or more packet properties and one or more actions for handling a packet, wherein the rules are ranked according to a ranking order;
   determine, for each packet handled at least a service protocol with which the packet is associated;
   apply at least one of said rules to each packet according to the ranking order and a determined protocol for that packet in order to match the packet to one of said rules and to determine one or more actions for handling the packet, and to determine information identifying user usage on a per service class basis;

periodically send said information to a policy and charging rules server; and receive at least one of an updated ranking order and one or more updated rules from the policy and charging rules server and installing the one or more updated rules and the updated ranking order in memory.

29. The computer program product of claim 28 wherein the packet classification rules classify each of one or more packets in a specific service session within a user session.

* * * * *